United States Patent
Ohta

(10) Patent No.: US 9,662,568 B2
(45) Date of Patent: May 30, 2017

(54) COMPUTER-READABLE NON-TRANSITORY STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Minami-ku, Kyoto (JP)

(72) Inventor: Keizo Ohta, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 195 days.

(21) Appl. No.: 14/575,473

(22) Filed: Dec. 18, 2014

(65) Prior Publication Data

US 2015/0209663 A1    Jul. 30, 2015

(30) Foreign Application Priority Data

Jan. 29, 2014    (JP) .................. 2014-014593

(51) Int. Cl.
*A63F 13/211* (2014.01)
*G06F 3/0346* (2013.01)
(Continued)

(52) U.S. Cl.
CPC .......... *A63F 13/211* (2014.09); *A63F 13/219* (2014.09); *A63F 13/426* (2014.09);
(Continued)

(58) Field of Classification Search
CPC ........ A63F 13/211; A63F 13/42; A63F 13/40; A63F 13/219; A63F 13/2145;
(Continued)

(56) References Cited

U.S. PATENT DOCUMENTS

| 7,102,616 B1* | 9/2006 | Sleator | G06F 3/0325 345/156 |
| 8,226,484 B2* | 7/2012 | Bryant | A63F 13/24 463/36 |

(Continued)

FOREIGN PATENT DOCUMENTS

JP    2010-207329    9/2010

OTHER PUBLICATIONS

2wheelsteve, "Motorcycle Counter Steering Made Simple" (https://www.youtube.com/watch?v=x1M9OaMUKJY), Jun. 29, 2013.*

(Continued)

*Primary Examiner* — Julie Anne Watko
(74) *Attorney, Agent, or Firm* — Nixon & Vanderhye P.C.

(57) ABSTRACT

It is a feature to provide an information processing program and the like which are able to enhance operability when a pointing operation or the like is performed with a pointing device which is operated while being held by both hands. First, an attitude of an operation device or a virtual operation device which is arranged in a virtual space and corresponds to the operation device is calculated on the basis of an output from an angular velocity sensor. Next, a rotation amount in a direction of a first axis in a coordinate system for a space in which the operation device or the virtual operation device is present is changed on the basis of a rotation amount about a second axis which is perpendicular to the first axis, the rotation amount in the direction of the first axis being calculated on the basis of the attitude. Then, a predetermined process is performed on the basis of the changed rotation amount in the direction of the first axis.

11 Claims, 12 Drawing Sheets

(51) Int. Cl.
*A63F 13/219* (2014.01)
*A63F 13/428* (2014.01)
*A63F 13/426* (2014.01)
*A63F 13/213* (2014.01)

(52) U.S. Cl.
CPC .......... *A63F 13/428* (2014.09); *G06F 3/0346* (2013.01); *A63F 13/213* (2014.09)

(58) Field of Classification Search
CPC .......... A63F 13/21; A63F 13/20; A63F 13/04; A63F 13/02; A63F 13/00; G06F 3/0346; G06F 3/033; G06F 3/03; G06F 3/01; G06F 3/00; G06F 3/017; G06F 3/014
See application file for complete search history.

(56) References Cited

U.S. PATENT DOCUMENTS

| | | | | |
|---|---|---|---|---|
| 8,337,308 | B2* | 12/2012 | Ito | A63F 13/42 463/37 |
| 8,576,169 | B2* | 11/2013 | Shaw | G06F 3/017 345/158 |
| 9,259,644 | B2* | 2/2016 | Nakajima | A63F 13/02 |
| 2008/0125224 | A1* | 5/2008 | Pollatsek | A63F 13/10 463/36 |
| 2009/0326850 | A1 | 12/2009 | Ohta | |
| 2011/0053691 | A1* | 3/2011 | Bryant | A63F 13/24 463/37 |
| 2012/0229454 | A1* | 9/2012 | Hayashi | A63F 13/06 345/419 |
| 2012/0309513 | A1* | 12/2012 | Abe | A63F 13/06 463/30 |
| 2015/0153381 | A1* | 6/2015 | Pollatsek | G01P 15/18 702/141 |

OTHER PUBLICATIONS

Nick versus Vick, "Wii Cow Racing Challenge", Canadian Family Vlog (https://www.youtube.com/watch?v=HCuxdPUcIME), Sep. 22, 2014.*
Rocket Rotations Boxy Axes (https://spaceflightsystems.grc.nasa.gov/education/rocket/rotations.html), NASA, Dec. 8, 2016.*

* cited by examiner

COMPUTER-READABLE NON-TRANSITORY STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2014-014593, filed on Jan. 29, 2014, is incorporated herein by reference.

FIELD

The exemplary embodiments relate to information processing in which a predetermined process is performed on the basis of an output from an operation device including an angular velocity sensor, and more particularly relate to information processing in which a predetermined process is performed on the basis of the attitude of an operation device.

BACKGROUND AND SUMMARY

Hitherto, an input device including a gyro-sensor is known. Among such input devices, there is an input device which has a substantially parallelepiped shape having a longitudinal direction as a front-rear direction thereof and is sized to be able to be held by one hand. Also, a technique using such an input device as a pointing device is known. In such a technique, a pointing operation is performed while a leading end portion of the input device is directed toward a screen. It is possible to change a pointing position in a right-left direction by rotating the input device itself about an axis along the direction of gravity.

The technique described above assumes, as the input device, a device which has a substantially parallelepiped shape and is able to be held by one hand. Here, a case is assumed in which, in a pointing operation in which the input device itself is moved as described above, the input device is operated while right and left ends of a housing thereof are held (the input device is held by both hands). As an example, an input device is assumed which includes a housing having a substantially rectangular plate shape which is laterally long. A case is considered in which a pointing operation is performed while the input device is held by both hands. A case is assumed in which, as the pointing operation, a pointing operation is performed while an upper side (leading end side) of the input device is directed toward a screen. In such a case of being held by both hands, for example, when it is attempted to change a pointing position in the right-left direction, some users may perform an operation so as to direct the leading end side of the input device left or right as shown in FIG. 16, but some other users may perform an operation so as to turn the input device without changing the direction of the leading end side of the input device as shown in FIG. 17. That is, because of the holding by both hands, two ways are conceivable for performing an operation when it is desired to move the pointing position in the right-left direction. In the technique described above, in the case of the former operation, it is possible to change the pointing position right and left, but in the case where the latter operation is performed, sufficiently good operability cannot be provided to the user.

Therefore, it is a feature of the exemplary embodiments to provide a computer-readable non-transitory storage medium having an information processing program stored thereon, an information processing apparatus, an information processing system, and an information processing method, which are able to enhance operability when a pointing operation or the like is performed with a pointing device which is operated while being held by both hands. It is noted that the computer-readable storage medium include, for example, a magnetic medium such as flash memory, ROM, or RAM, or an optical medium such as CD-ROM, DVD-ROM, or DVD-RAM.

In order to attain the feature described above, the following configuration examples are exemplified.

A configuration example is a computer-readable non-transitory storage medium having stored thereon an information processing program executed by a computer of an information processing apparatus which performs a predetermined process on the basis of an output from an operation device including an angular velocity sensor. The information processing program causes the computer to function as an attitude calculator, a rotation amount change section, and a process execution section. The attitude calculator calculates an attitude of the operation device or a virtual operation device which is arranged in a virtual space and corresponds to the operation device, on the basis of an output from the angular velocity sensor. The rotation amount change section changes a rotation amount in a direction of a first axis in a coordinate system for a space in which the operation device or the virtual operation device is present, on the basis of a rotation amount about a second axis which is perpendicular to the first axis, the rotation amount in the direction of the first axis being calculated on the basis of the attitude. The process execution section performs the predetermined process on the basis of the rotation amount in the direction of the first axis which has been changed by the rotation amount change section.

According to the above configuration example, it is possible to enhance the operability of, for example, a pointing operation of performing pointing with the pointing device in a right-left direction by moving the input device itself, a cursor moving operation, or the like.

In another configuration example, the process execution section may perform the predetermined process on the basis of a rotation amount about the first axis and the rotation amount in the direction of the first axis which has been changed by the rotation amount change section.

According to the above configuration example, for example, an input in an up-down direction is also enabled in addition to the right-left direction, and it is possible to further enhance the operability.

In another configuration example, the rotation amount change section may change the rotation amount in the direction of the first axis such that the greater the rotation amount about the second axis is, the more greatly the rotation amount in the direction of the first axis is changed. Furthermore, the rotation amount change section may be configured to include a change content determination section configured to determine whether to change the rotation amount in a direction in which the rotation amount is increased or in a direction in which the rotation amount is decreased, of the direction of the first axis, in accordance with a direction of rotation about the second axis.

According to the above configuration example, it is possible to provide a more intuitive operation feeling. In addition, it is possible to determine whether to change the rotation amount in the direction in which the rotation amount is increased or in the direction in which the rotation amount is decreased, in accordance with a direction of rotation about the second axis, and a more fine operation is enabled.

In another configuration example, the operation device may include a housing which is held by right and left hands of a user so that an operation is allowed to be performed. In addition, the first axis may be an axis along a direction of rotation of the operation device when the operation device is rotated such that: when a right hand side of the housing held by the right and left hands of the user is moved in a direction away from the user as seen from the user, a left hand side of the housing is moved in a direction toward the user as seen from the user; and when the right hand side of the housing is moved in the direction toward the user as seen from the user, the left hand side of the housing is moved in the direction away from the user as seen from the user, and the second axis may be an axis which is a rotation axis when the attitude of the operation device is rotated such that: when the right hand side of the housing held by the right and left hands of the user is lifted as seen from the user, the left hand side of the housing is lowered; and when the right hand side of the housing is lowered as seen from the user, the left hand side of the housing is lifted. Furthermore, the first axis may be an axis which is perpendicular to a direction of gravity and is along a right-left direction as seen from the user, and the second axis may be an axis which is perpendicular to both the first axis and the direction of gravity.

According to the above configuration example, it is possible to further enhance the operability of the input device which is held by both hands and allows a pointing position on the screen to be changed by moving the input device itself.

In another configuration example, the predetermined process may be a pointing process of pointing to a position on a predetermined screen. Furthermore, when the rotation amount change section changes the rotation amount by using the virtual operation device, the predetermined process may be a pointing process with respect to a virtual screen arranged in the virtual space in which the virtual operation device is arranged.

According to the above configuration example, it is possible to further enhance the operability of the pointing operation.

According to the present embodiment, it is possible to further enhance the operability in pointing or the like with the pointing device which is held by both hands.

DETAILED DESCRIPTION OF NON-LIMITING EXAMPLE EMBODIMENTS

Hereinafter, one exemplary embodiment will be described.

Figure 1:
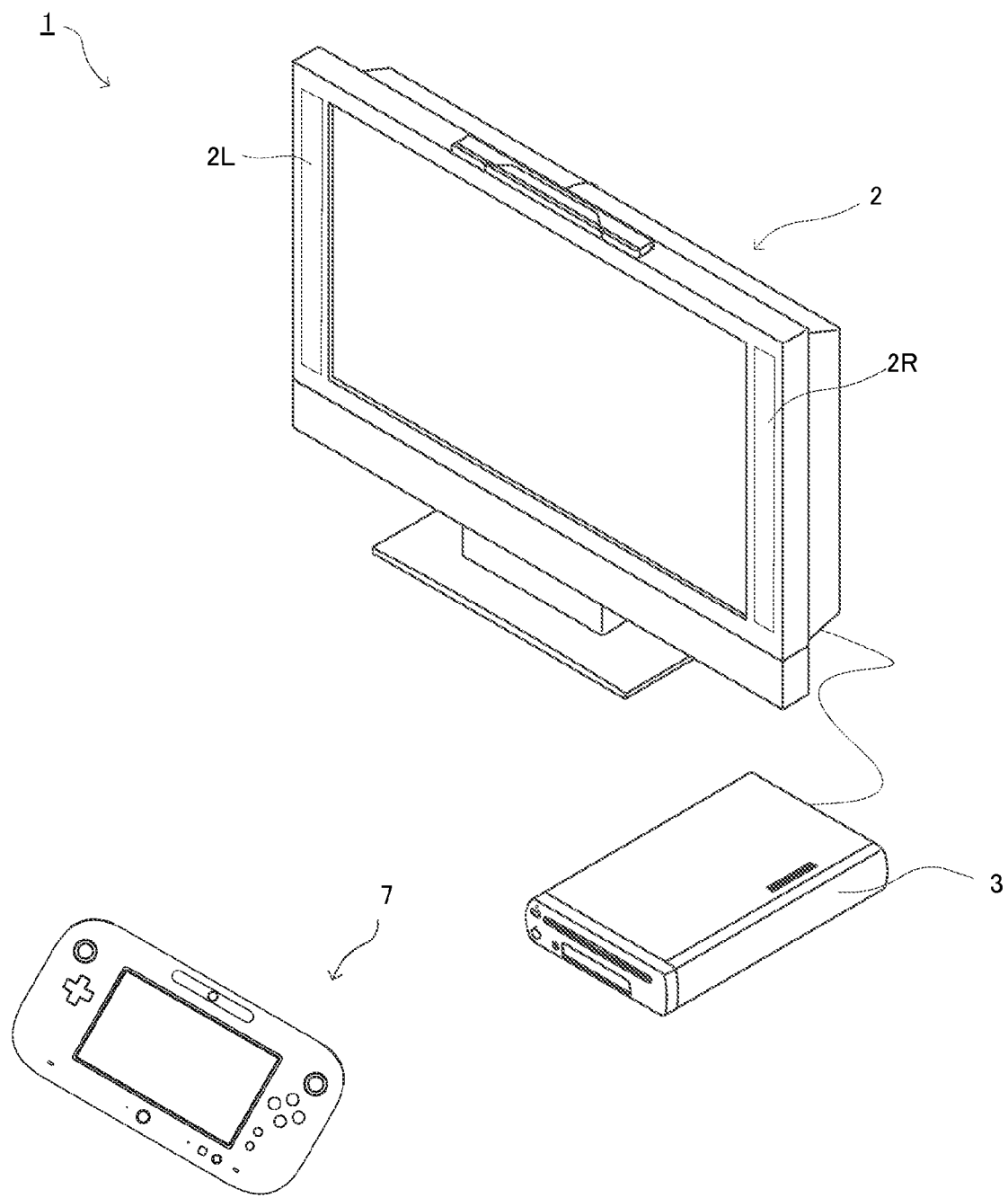
FIG. 1 is a schematic diagram showing the whole image of an information processing system which is a non-limiting example of an embodiment.

Hereinafter, a game system 1 according to the present embodiment will be described with reference to the drawings. FIG. 1 is an external view of the game system 1. In FIG. 1, the game system 1 includes a stationary display device (hereinafter, referred to as "television") 2 typified by, for example, a television receiver, a stationary game apparatus 3, and a terminal device 7. The game system 1 performs information processing such as game processing in the game apparatus 3 on the basis of an operation with the terminal device 7 which also serves as an input device (controller), and displays an image obtained by the processing, on the television 2 and/or the terminal device 7.

An optical disc (not shown) which is an example of an information storage medium replaceably used with respect to the game apparatus 3 is detachably inserted in the game apparatus 3.

The television 2 is connected to the game apparatus 3 via a connection cord. The television 2 displays a game image obtained by game processing performed in the game apparatus 3. It is noted that in another embodiment, the game apparatus 3 and the stationary display device may be integrated with each other. In addition, communication between the game apparatus 3 and the television 2 may be wireless communication.

The terminal device 7 is sized to be able to be held by both hands of the user, and the user can hold and move the terminal device 7 when using the terminal device 7. Although the detailed configuration of the terminal device 7 will be described later, the terminal device 7 includes an LCD (Liquid Crystal Display) 71 as display means, and input means (various buttons, a motion sensor 82 described later, etc.). The terminal device 7 and the game apparatus 3 are able to communicate with each other wirelessly (via a wire). The terminal device 7 transmits, to the game apparatus 3, operation data representing the content of an operation performed on the terminal device 7. In addition, the terminal device 7 is able to receive, from the game apparatus 3, data of an image (e.g., a game image) generated in the game apparatus 3, and display the image on the LCD 71.

Figure 2:
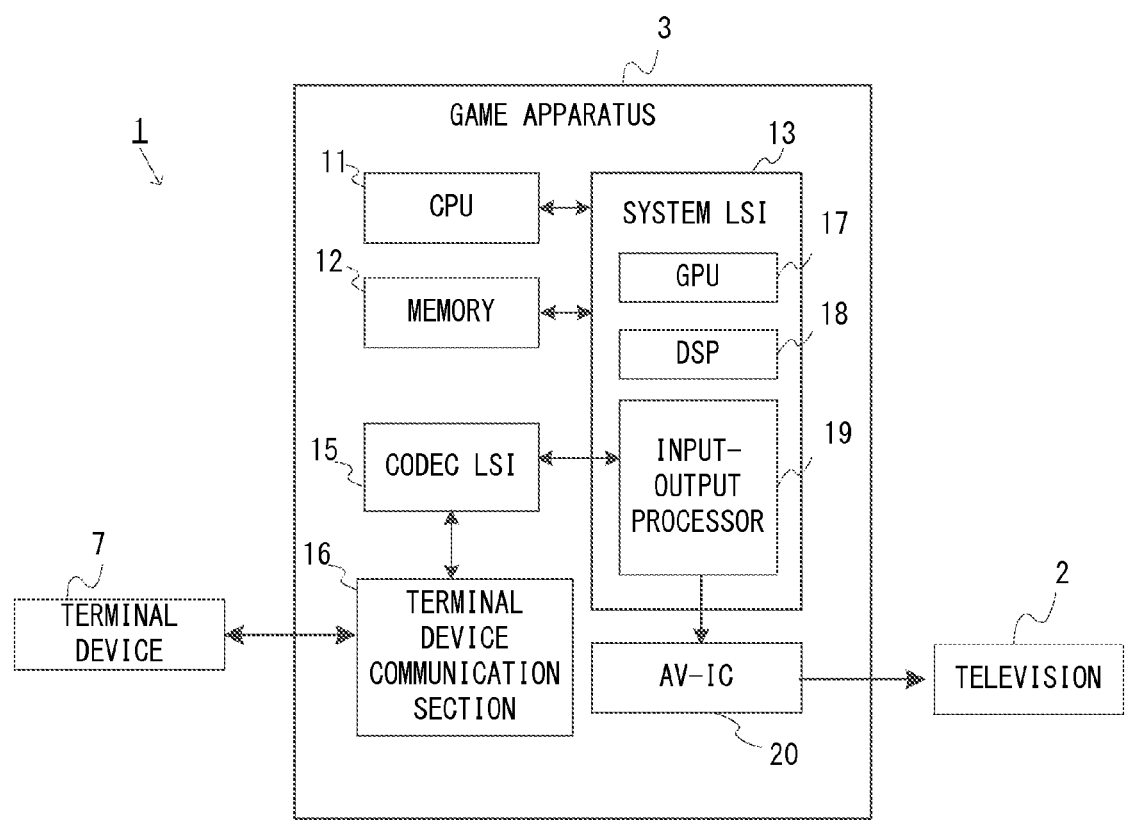
FIG. 2 is a block diagram showing a non-limiting example of the configuration of a game apparatus 3.

FIG. 2 is a block diagram of the game apparatus 3 which is an example of an information processing apparatus. In FIG. 2, the game apparatus 3 includes a CPU (control section) 11, a memory 12, a system LSI 13, a codec LSI 15, a terminal device communication section 16, an AV-IC (Audio Video-Integrated Circuit) 20, and the like.

The CPU 11 performs a predetermined information processing program (a game program in the present embodiment) by using the memory 12, the system LSI 13, and the like. By so doing, various functions (e.g., game processing) in the game apparatus 3 are realized. The CPU 11 is connected to the system LSI 13. It is noted that the configuration is not limited to one having the single CPU 11, and in another embodiment, for example, a plurality of processors may be included, and distributed processing of a process described later may be performed by the plurality of processors.

The system LSI 13 includes a PGU (Graphics Processor Unit) 17, a DSP (Digital Signal Processor) 18, an input-output processor 19, and the like. The GPU 17 generates an image in accordance with a graphics command (image generation command) from the CPU 11. The game apparatus 3 is able to generate both a game image to be displayed on the television 2 and a game image to be displayed on the terminal device 7. In the present embodiment, a case where a game image is displayed only on the television 2 will be described as an example.

The DSP 18 serves as an audio processor, and generates audio data by using sound data and acoustic waveform (tone quality) data which are stored in the memory 12.

The input-output processor 19 transmits data to components connected thereto, receives data from the components, and downloads data from an external apparatus. The input-output processor 19 is connected to the codec LSI 15 and the AV-IC 20. The codec LSI 15 is connected to the terminal device communication section 16, and an antenna (not shown) is connected to the terminal device communication section 16. The codec LSI 15 is used for compression/decompression processes performed when an image, audio data, or the like is transmitted or received to or from the terminal device 7. The input-output processor 19 transmits data to the terminal device 7 or receives data from the terminal device 7 via the terminal device communication section 16. For example, the input-output processor 19 receives operation data transmitted from the terminal device 7 and stores (temporarily stores) the operation data into a buffer area of the memory 12.

Data of an image and a sound to be outputted at the television 2, among images and sounds generated in the game apparatus 3, is read by the AV-IC 20. The AV-IC 20 outputs the read image data to the television 2 via an AV connector (not shown), and outputs the read audio data via the AV connector to speakers 2L and 2R included in the television 2. Accordingly, the image is displayed on the television 2, and the sound is outputted from the speakers 2L and 2R.

The game apparatus 3 is able to receive various data from the terminal device 7. For example, the terminal device 7 transmits operation data. The input-output processor 19 stores (temporarily stores) data received from the terminal device 7, into the buffer area of the memory 12.

Figure 3:
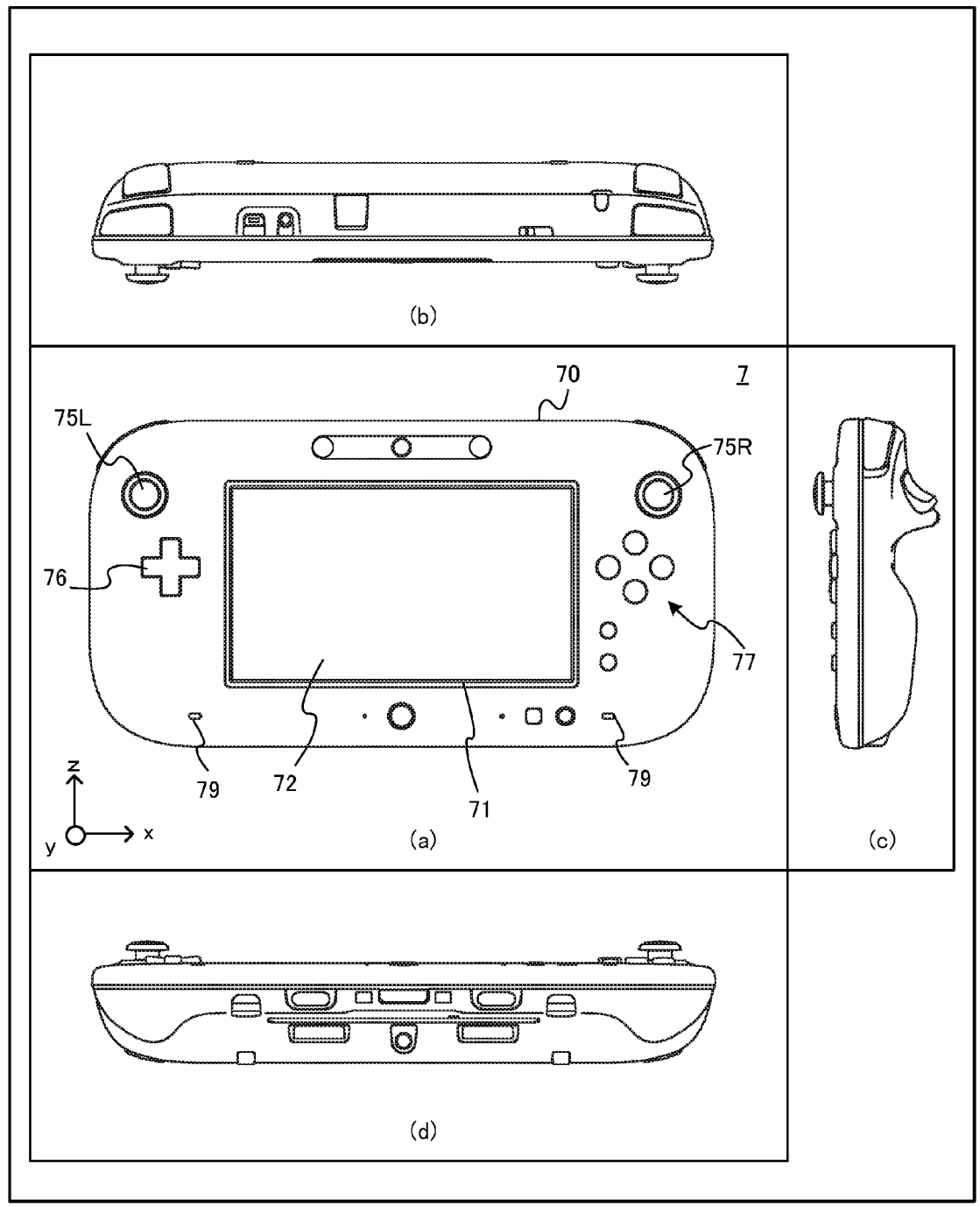
FIG. 3 is a diagram showing a non-limiting example of the external configuration of a terminal device 7.

Next, the configuration of the terminal device 7 will be described with reference to FIG. 3. FIG. 3 is a diagram showing the external configuration of the terminal device 7. In FIG. 3, (a) is a front view of the terminal device 7; (b) is a top view of the terminal device 7; (c) is a right side view of the terminal device 7; and (d) is a bottom view of the terminal device 7.

As shown in FIG. 3, the terminal device 7 includes a housing 70 which generally has a rectangular plate shape which is laterally long. The housing 70 is sized to be able to be held by the right and left hands of the user. Therefore, the user can hold and move the terminal device 7.

The terminal device 7 includes the LCD 71 on a front surface of the housing 70. The LCD 71 is provided near the center of the front surface of the housing 70. In addition, the terminal device 7 includes, as one of operation means, a touch panel 72 on the screen of the LCD 71. Furthermore, the terminal device 7 includes, as operation means, two analog sticks 75L and 75R, a cross button 76, and a plurality of buttons 77 (corresponding to an operation section 81 shown in FIG. 4). Each of the analog sticks 75L and 75R is a device for designating a direction.

The terminal device 7 includes speakers which are sound output means. As shown in (d) of FIG. 3, speaker holes 79 are provided in a lower portion of the front surface of the housing 70. A sound is outputted from the speakers through the speaker holes 79. In the present embodiment, the terminal device 7 includes two speakers, and the speaker holes 79 are provided at the respective positions of the right and left speakers.

Figure 4:
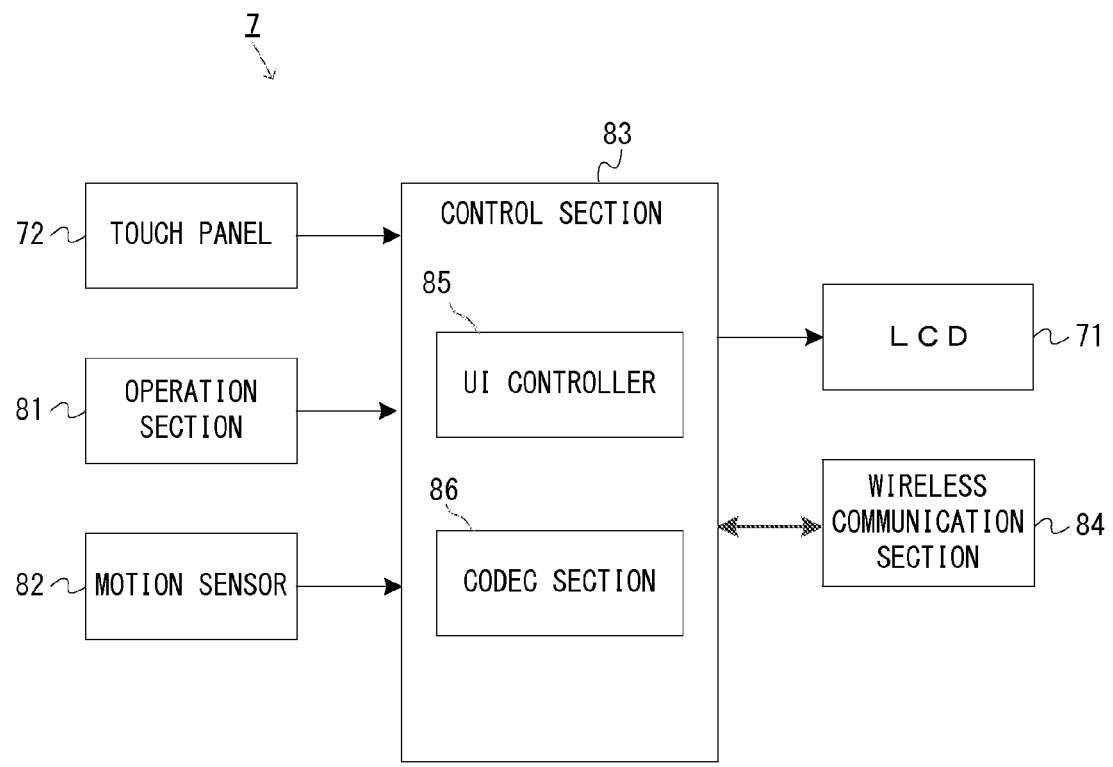
FIG. 4 is a block diagram showing the configuration of the terminal device 7.
Figure 6:
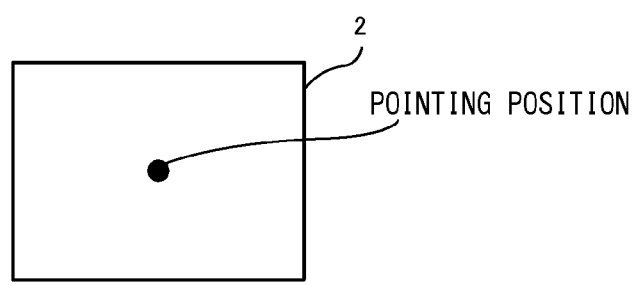
FIG. 6 is a diagram for explaining the outline of the process performed in the embodiment.

Next, the internal configuration of the terminal device 7 will be described with reference to FIG. 6. FIG. 4 is a block diagram showing the internal configuration of the terminal device 7. As shown in FIG. 4, in addition to the components shown in FIG. 3, the terminal device 7 includes a control section 83, a wireless communication section 84, the motion sensor 82, and the like. These electronic components are mounted on an electronic circuit substrate and accommodated in the housing 70.

The motion sensor 82 is a sensor for detecting the attitude of the terminal device 7. In the present embodiment, an acceleration sensor, an angular velocity sensor, and a magnetic sensor are provided as the motion sensor 82. In the present embodiment, a process of detecting the attitude of the terminal device 7 is performed mainly by using angular velocity data outputted from the angular velocity sensor.

The control section 83 includes a UI controller 85, a codec section 86, and the like. The UI controller 85 controls input and output of data to and from various input/output sections. The codec section 86 performs a compression process on data to be transmitted to the game apparatus 3, and performs a decompression process on data transmitted from the game apparatus 3. The control section 83 transmits operation data acquired from the touch panel 72, the operation section 81 (the analog sticks 75L and 75R, the cross button 76, and the plurality of buttons 77), and the motion sensor 82, as terminal operation data to the game apparatus 3 via the wireless communication section 84. In addition, compressed image data and compressed audio data can be transmitted from the game apparatus 3 to the terminal device 7. When such data is transmitted, these data is transmitted via the wireless communication section 84 to the control section 83. The control section 83 (the codec section 86 thereof) decompresses received image data and audio data. The decompressed image data is outputted to the LCD 71, and an image based on the image data is displayed on the LCD 71. In addition, the decompressed audio data is outputted to a sound IC (not shown), and the sound IC causes a sound, based on the audio data, to be outputted from a speaker (not shown).

Next, an outline of operation of information processing performed in the information processing system according to the present embodiment will be described. The processing according to the present embodiment is processing related to designating (pointing to) a position on the screen. Specifically, the processing relates to a process performed in the case where the terminal device 7 is used as a pointing device (hereinafter, abbreviated as PD).

First, a basic method of holding the terminal device 7 and an initial attitude of the terminal device 7 with respect to the screen in the present embodiment will be briefly described as a precondition for the following description. As a method of holding the terminal device 7, in the present embodiment, a case of holding the terminal device 7 by both hands is assumed. That is, a case is assumed in which a side of the terminal device 7 at which there is the cross button 76 is held by the left hand and a side of the terminal device 7 at which there is the plurality of buttons 77 is held by the right hand. In addition, a description will be given on the assumption that in a space coordinate system for a real space or a virtual space described below, an axis along the direction of gravity is defined as a y axis, an axis along a lateral direction is defined as an x axis, and an axis along a depth direction is defined as a z axis.

Figure 5A:
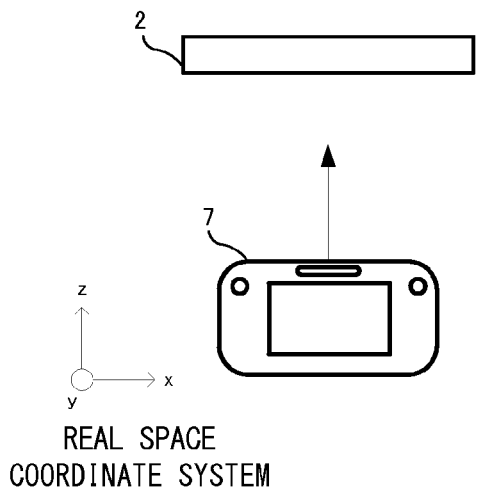
FIG. 5A is a diagram for explaining an outline of a process performed in the embodiment.
Figure 5B:
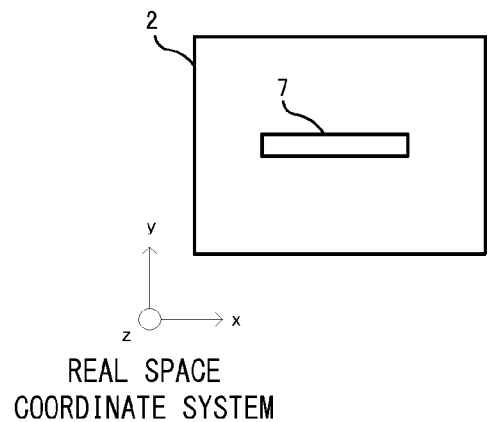
FIG. 5B is a diagram for explaining the outline of the process performed in the embodiment.
Figure 5C:
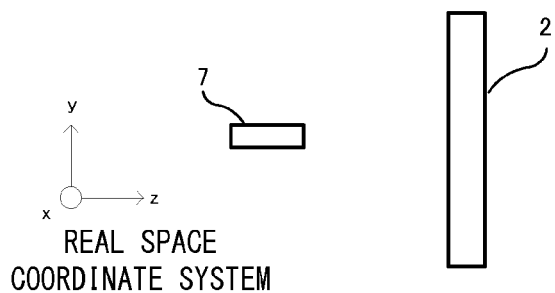
FIG. 5C is a diagram for explaining the outline of the process performed in the embodiment.

In the present embodiment, a pointing operation is performed by directing the upper surface side (the z axis positive direction in (a) of FIG. 3) of the terminal device 7 toward the screen (i.e., by changing the attitude of the terminal device 7). Then, a description will be given on the assumption that the attitude of the terminal device 7 when the front surface side (the surface on which the LCD 71 is present, the y axis positive direction in (a) of FIG. 3) is directed vertically upward and the upper surface side (the z axis positive direction in (a) of FIG. 3) is directed toward the screen is defined as the initial attitude of the terminal device 7 in a process described later. In addition, regarding the positional relation between the screen of the television 2 and the terminal device 7, a case is assumed in which a substantially center of the upper surface side of the terminal device 7 in the initial attitude faces the center of the screen. FIGS. 5A to 5C are diagrams for showing the initial attitude. FIG. 5A shows a situation as seen from the upper surface side of the coordinate system for the real space. FIG. 5B shows a view as seen from the front side of the screen and the lower surface side of the terminal device 7. FIG. 5C shows a view as seen from the right surface side of the television 2 and the terminal device 7. Then, in the case of such an attitude, the pointing position is at the center of the screen as shown in FIG. 6.

It is noted that the initial attitude is an attitude used for convenience of the following description, and in another embodiment, the initial attitude is not necessarily limited to such an attitude. The process described later is also applicable to, for example, a case where a pointing operation is performed while the back surface side of the terminal device 7 is directed toward the screen (in this case, for example, it suffices that adjustment for correspondence for the axis direction, such as replacing the z axis positive direction with the y axis negative direction, is performed).

Figure 7A:
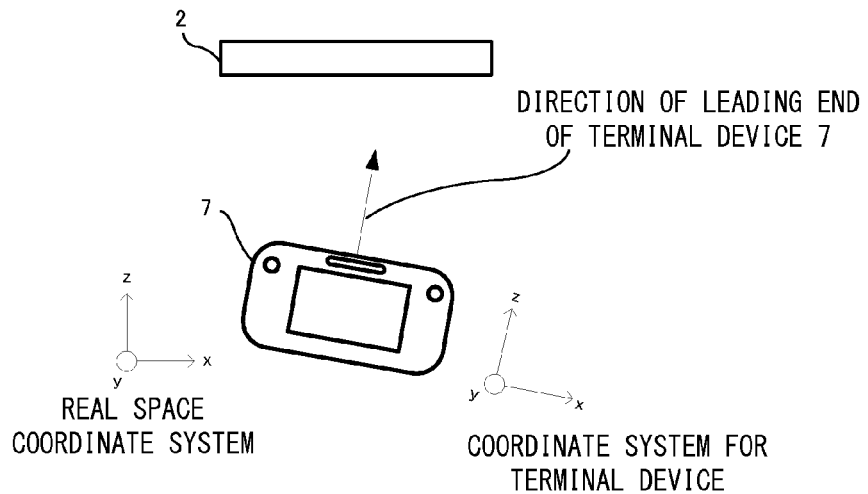
FIG. 7A is a diagram for explaining the outline of the process performed in the embodiment.
Figure 7B:
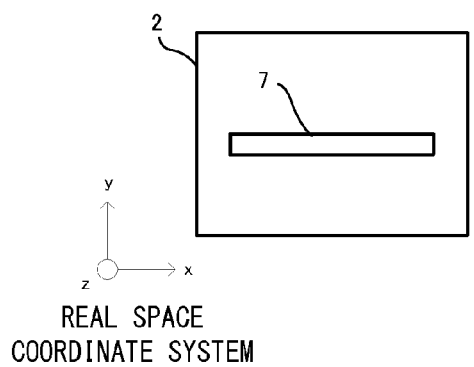
FIG. 7B is a diagram for explaining the outline of the process performed in the embodiment.
Figure 7C:
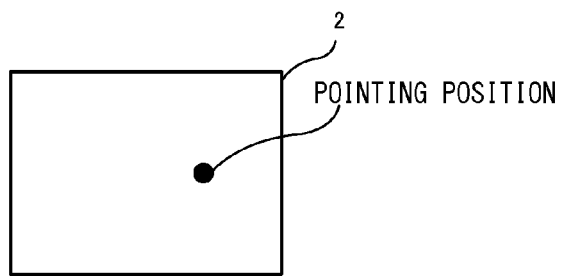
FIG. 7C is a diagram for explaining the outline of the process performed in the embodiment.

Next, a case will be considered in which, on the assumption of the holding method and the attitude as described above, a pointing operation is performed by directing the z axis positive direction (hereinafter, referred to as a leading end direction) of the terminal device 7 toward the screen. In particular, in the present embodiment, a case will be considered in which a pointing operation is performed with a change of the screen in the right-left direction (horizontal direction). In this case, for example, in the case where it is desired to move the pointing position rightward without changing the position of the terminal device 7 when the initial pointing position is at the center of the screen, the following operation is conceivable as an operation in this case. First, an operation of rotating the terminal device 7 rightward about the y axis thereof is conceivable. FIGS. 7A to 7C are schematic diagrams for showing such an operation. FIG. 7A shows a view as seen from the upper surface side of the real space. As shown in FIG. 7A, the attitude of the terminal device 7 has been changed such that the leading end direction of the terminal device 7 is tilted slightly rightward from the initial position thereof. FIG. 7B shows a view as seen from the lower surface side of the terminal device 7. Regarding the attitude of the terminal device 7, FIG. 7B shows that the terminal device 7 has been rotated only about the y axis but has not been rotated about any other axes. FIG. 7C shows the pointing position in this case. This pointing position is a position shifted slightly rightward from the screen center. That is, this operation is an operation of directing the leading end direction of the terminal device 7 rightward.

Figure 8A:
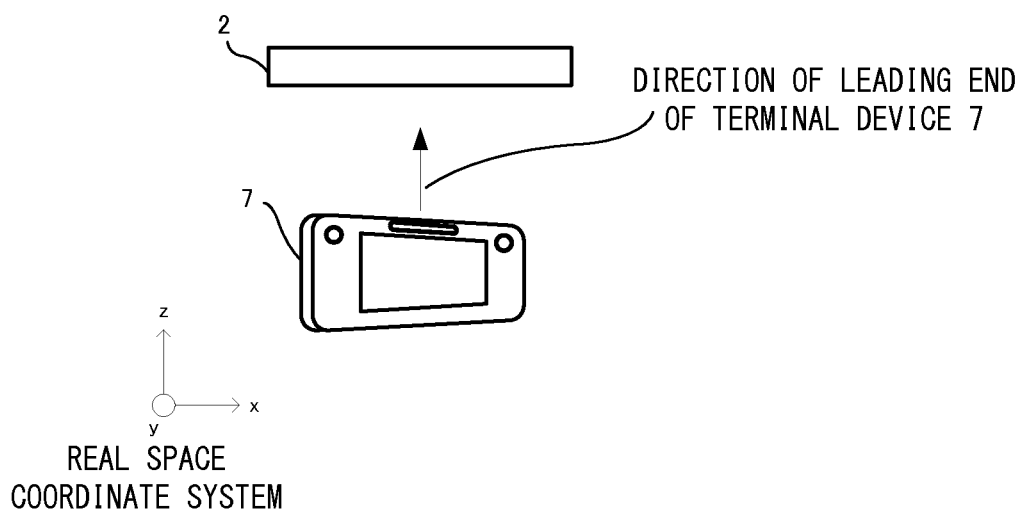
FIG. 8A is a diagram for explaining the outline of the process performed in the embodiment.
Figure 8B:
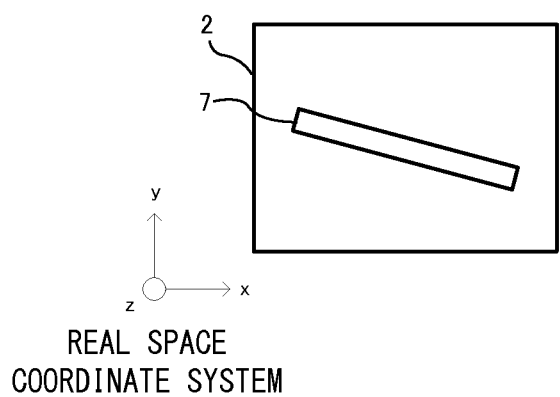
FIG. 8B is a diagram for explaining the outline of the process performed in the embodiment.

In the present embodiment, the terminal device 7 is held by both hands as described above. Because of such a holding method, depending on a person, a case of performing the following operation when it is desired to move the pointing position in the right-left direction is also conceivable. Specifically, the operation is an operation of rotating the terminal device 7 about the z axis thereof (turning the terminal device 7) thereby to attempt to change the pointing position in the right-left direction. FIGS. 8A and 8B are schematic diagrams showing an example of such an operation. FIG. 8A shows a situation as seen from the upper surface side of the real space, and FIG. 8B shows a situation as seen from the lower surface side of the terminal device 7. In the case of such an operation, only rotation (turn) of the terminal device 7 about the z axis is made, and the leading end direction of the terminal device 7 is not changed. Thus, in consideration of the leading end direction of the terminal device 7 itself, the pointing position is not changed.

Therefore, in the present embodiment, the following control is performed, whereby a pointing position is changed in the right-left direction even when the operation as shown in FIGS. 8A and 8B (hereinafter, referred to as a turning operation) is performed, and the operability is improved. In other words, in the case of a turning operation, an assist for the pointing operation is performed.

Hereinafter, the principle and outline of control in the present embodiment will be described. In the present embodiment, a concept of a virtual pointing device (hereinafter, referred to as virtual PD) and a virtual screen is used in order to change a pointing position even with the turning operation as described above. That is, a virtual PD corresponding to the terminal device 7 in the real space is arranged in the virtual space. In addition, a virtual screen corresponding to the screen of the television 2 in the real space is also arranged in the virtual space. The positional relation between the virtual PD and the virtual screen is the same as the positional relation between the terminal device 7 and the television 2 in the real space. In addition, the size (resolution) of the virtual screen is the same as the size (resolution) of the screen of the television 2. In addition, the initial attitude of the virtual PD is the same as the initial attitude described above. Moreover, regarding the attitude of the virtual screen, the virtual screen is arranged in such an attitude that a screen plane thereof is parallel to the direction of gravity in the virtual space. Furthermore, the coordinate system for the virtual screen coincides with the space coordinate system for the virtual space.

Figure 9:
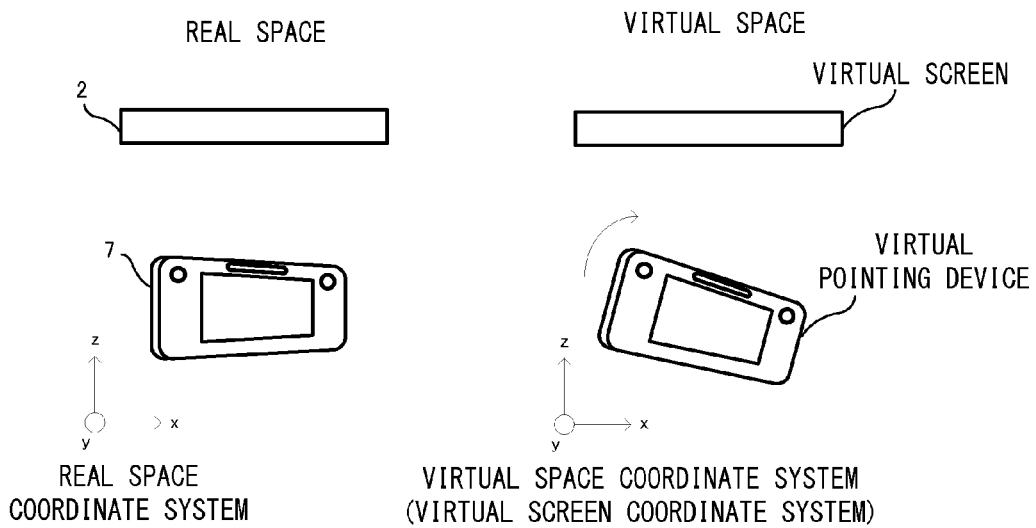
FIG. 9 is a diagram for explaining the outline of the process performed in the embodiment.
Figure 10:
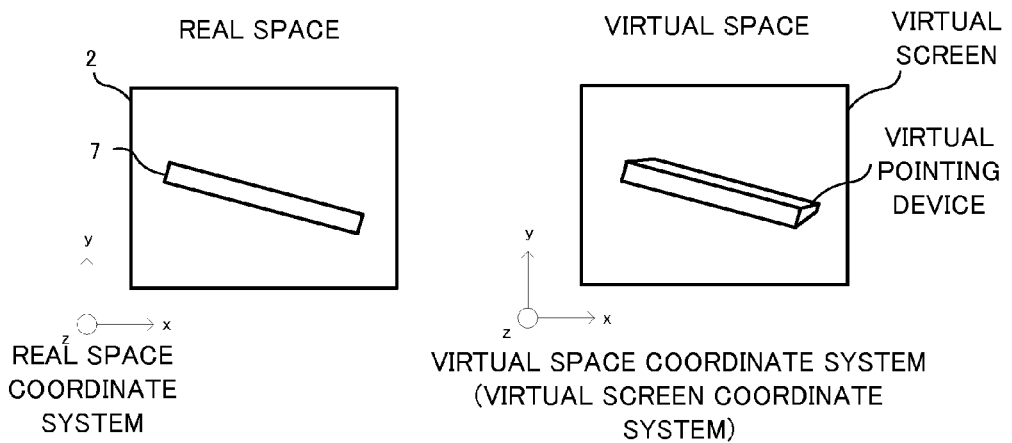
FIG. 10 is a diagram for explaining the outline of the process performed in the embodiment.
Figure 11:
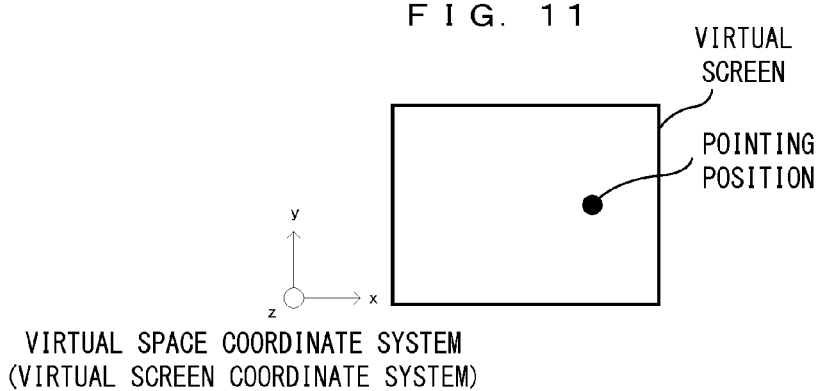
FIG. 11 is a diagram for explaining the outline of the process performed in the embodiment.

First, when the turning operation described above is performed on the terminal device 7, a turning direction (a degree of tilt) of the terminal device 7 is calculated on the basis of an output from the motion sensor 82. Next, a leading end direction (z axis direction) of the virtual PD is changed along the right-left direction (x axis direction) thereof as appropriate on the basis of the turning direction and the coordinate system for the virtual screen (the space coordinate system for the virtual space). In other words, a z axis component obtained when the attitude of the virtual PD is represented as a three axis vector, that is, an xyz axis vector, is changed. FIGS. 9 and 10 are diagrams showing a situation of the terminal device 7 in the real space and the virtual PD in the virtual space in such a case. FIG. 9 shows a situation as seen from the upper side of the real space and the virtual space. FIG. 10 shows a situation as seen from the front side of each of the television 2 and the virtual screen. As shown in FIGS. 9 and 10, in the real space, the attitude of the terminal device 7 is such an attitude that the terminal device 7 is only rotated (clockwise) about the z axis, whereas, in the virtual PD, the attitude of the virtual PD is such an attitude that the terminal device 7 is further rotated about the y axis on the basis of a turning direction (the right side in this case). Then, the attitude of the virtual PD in the x axis direction and the y axis direction is adjusted so as to match the changed z axis component. Then, a pointing position on the virtual screen is calculated on the basis of the attitude (mainly the leading end direction) of the virtual PD (see FIG. 11), and control is performed such that the calculated pointing position is reflected as a pointing position on the screen of the television 2.

By performing such a process, it is possible to change a pointing position in the right-left direction even either in the case of the operation as shown in FIGS. 7A and 7B described above or in the case of the turning operation as shown in FIGS. 8A and 8B described above, and it is possible to improve the operability.

Next, the process performed by the game apparatus 3 according to the present embodiment will be described in more detail with reference to FIGS. 12 to 15.

Figure 12:
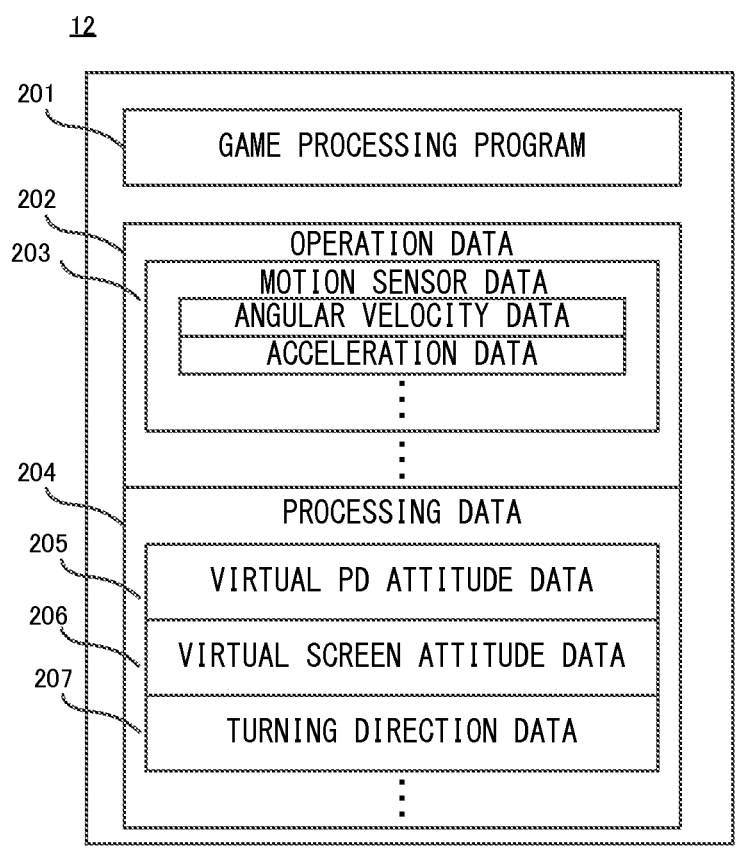
FIG. 12 is a diagram showing various data used in the process of the embodiment.

FIG. 12 shows an example of a program and information stored in the memory 12 of the game apparatus 3. In the memory 12, a game processing program 201, operation data 202, processing data 204, and the like are stored.

The game processing program 201 is a program for performing game processing including the above-described pointing process and the like. Specifically, the game processing program 201 is a program for performing a process in a flowchart of FIG. 13 described later.

The operation data 202 is data indicating various operations performed on the game apparatus 3 with the terminal device 7. The operation data 202 includes motion sensor data 203 and the like. The motion sensor data 203 includes acceleration data and angular velocity data outputted from the motion sensor 82.

The processing data 204 includes virtual PD attitude data 205, virtual screen attitude data 206, turning direction data 207, and the like.

The virtual PD attitude data 205 is data for indicating the attitude of the virtual PD. In the present embodiment, the virtual PD attitude data 205 is data indicated by a three axis vector (hereinafter, also sometimes referred to as an attitude vector) composed of three axis components, that is, x, y, and z axis components. Specifically, regarding the attitude of the virtual PD, the attitude in the z axis direction in FIG. 3 (the leading end direction) is represented as (Zx, Zy, Zz), the attitude in the x axis direction in FIG. 3 (the rightward direction) is represented as (Xx, Xy, Xz), and the attitude in the y axis direction (the upward direction) is represented as (Yx, Yy, Yz).

The virtual screen attitude data 206 is data for indicating the attitude of the virtual screen. This data is also data indicated by a three axis vector composed of three axis components, that is, x, y, and z axis components. Specifically, regarding the attitude of the virtual screen, the attitude in the depth direction is represented as (Vx, Vy, Bz), the attitude in the horizontal axis direction (the rightward direction) is represented as (Wx, Wy, Wz), and the attitude in the vertical axis direction (the upward direction) is represented as (Ux, Uy, Uz). In the present embodiment, an attitude in which the screen plane is parallel to the direction of gravity in the virtual space as described above is preset as the virtual screen attitude data 206.

The turning direction data 207 is data for indicating a turning direction when an operation of rotating the terminal device 7 about the z axis thereof, that is, a turning operation, is performed. Although details will be described later, in the present embodiment, a direction in which the upward direction of the virtual PD is directed with respect to the virtual screen is taken as a variable (Nx, Ny). In an unturned state, (Nx, Ny) is set as (0, 1).

Additionally, various data required for the game processing, such as data indicating the size (resolution, etc.) of the virtual screen and data indicating the arrangement coordinates of the virtual PD and the virtual screen in the virtual space, are also generated as part of the processing data 204 as appropriate and stored in the memory 12.

Next, flow of the process performed by the CPU 11 of the game apparatus 3 will be described with reference to the flowchart of FIG. 13. It is noted that here, only a process regarding the pointing control described above will be described, and the description of the other game processing is omitted. In addition, in the present embodiment, this process is repeatedly performed on a frame-by-frame basis.

First, in step S1, the attitude of the virtual PD is calculated on the basis of an output from the motion sensor 82. Specifically, on the basis of the angular velocity data included in the operation data 202, the attitude of the virtual PD is calculated as an attitude vector which is a three axis vector. In addition, in this attitude calculation, the attitude may be calculated by using the acceleration data in combination with the angular velocity data. Then, data of the three axis vector indicating the attitude is stored as the virtual PD attitude data 205. At that time, the attitude of the virtual PD coincides with the attitude of the terminal device 7.

Figure 14:
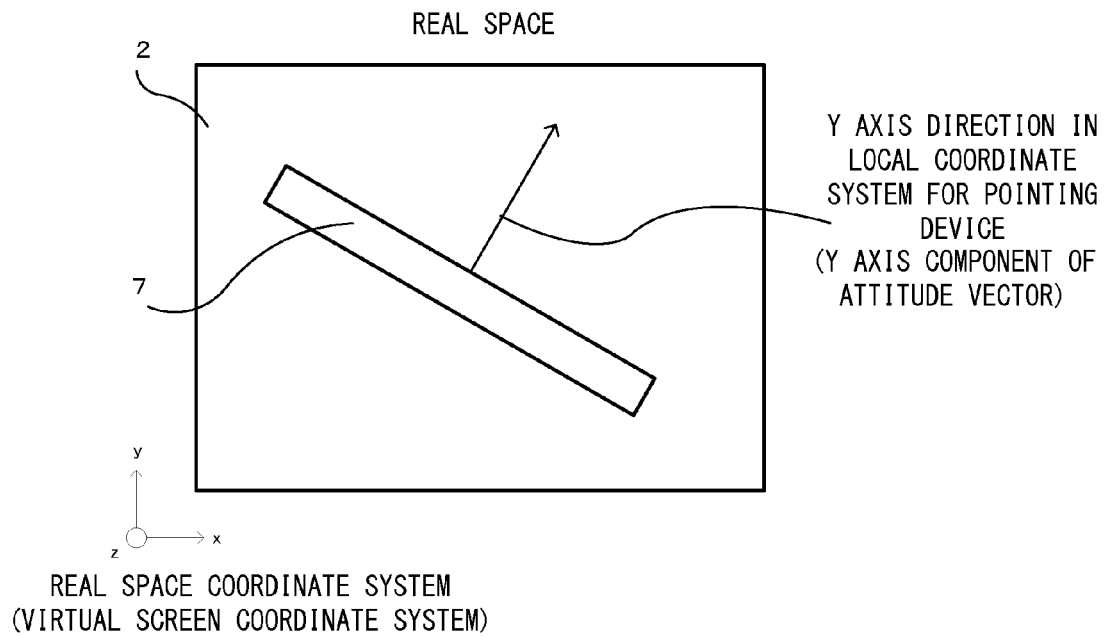
FIG. 14 is a diagram for explaining a method of calculating a turning direction.
Figure 15:
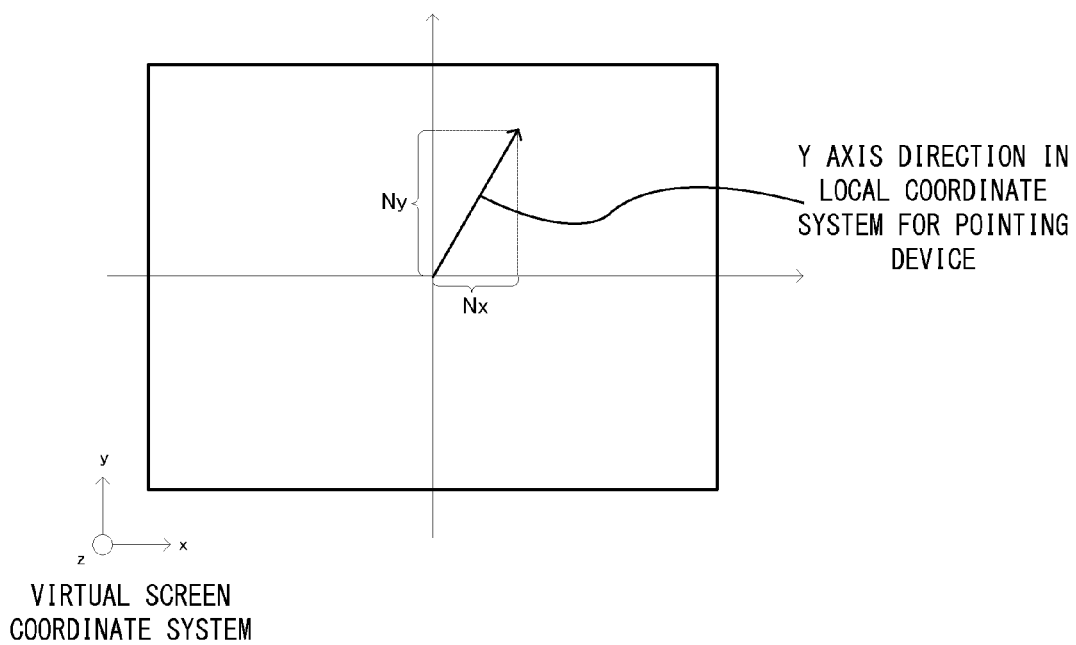
FIG. 15 is a diagram for explaining the method of calculating a turning direction.
Figure 16:
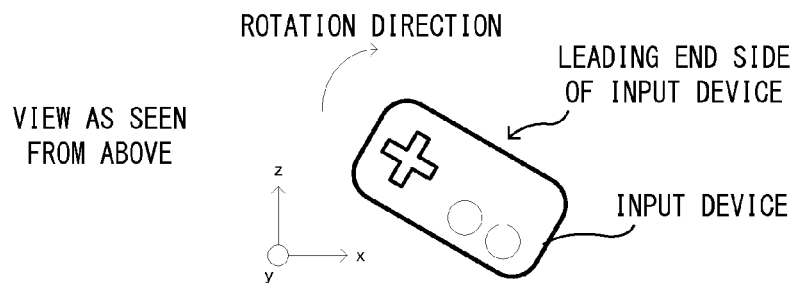
FIG. 16 is a diagram showing an example of an operation of an input device.
Figure 16:
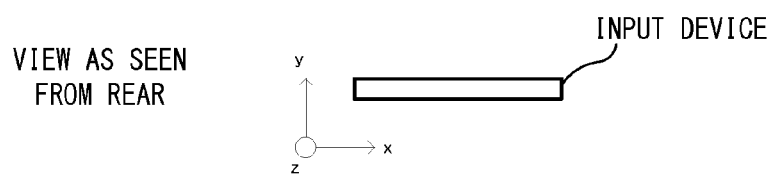
Figure 17:
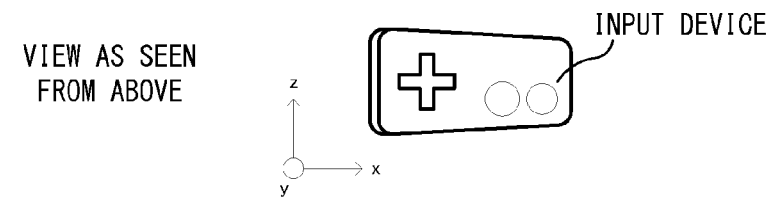
FIG. 17 is a diagram showing an example of the operation of the input device.
Figure 17:
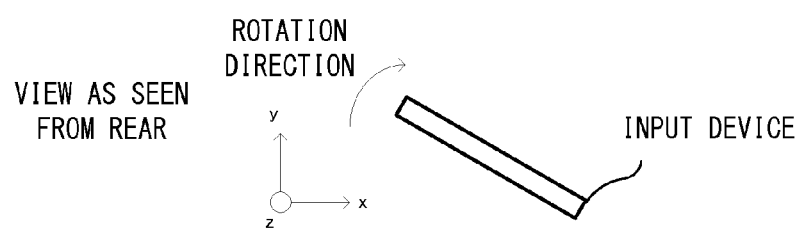

Next, in step S2, a turning direction of the virtual PD with respect to the virtual screen is calculated. In the present embodiment, the calculation is performed by the following method. First, as shown in FIG. 14, an arrow indicating the upward direction (the y axis component of the attitude) of the virtual PD is projected on the virtual screen. Then, as shown in FIG. 15, the degree of tilt of the projected arrow is calculated as (Nx, Ny) and stored as the turning direction data 207 in the memory 12. It is noted that the degree of tilt of the arrow (the turning direction) indicates an amount of rotation of the virtual PD about the z axis. Specifically, the degree of tilt of the arrow is calculated on the basis of the following formulas.

$$Nx = Yx \times Wx + Yy \times Wy + Yz \times Wz \quad \text{formula 1}$$

$$Ny = Yx \times Ux + Yy \times Uy + Yz \times Uz \quad \text{formula 2}$$

The above formulas are formulas for calculating the inner products of Nx and Ny. Furthermore, when only the inner products are calculated, a length is indefinite, and thus the inner products are normalized such that the length is 1.

Referring back to FIG. 13, next, in step S3, a process of changing the leading end direction of the virtual PD (the z axis component of the attitude vector of the virtual PD) in the right-left direction of the virtual screen (the x axis direction in the coordinate system for the virtual screen) on the basis of the variable Nx described above, is performed. That is, the leading end direction of the virtual PD is changed on the basis of the coordinate system for the virtual screen, not a local coordinate system for the virtual PD. Specifically, the z axis component of the attitude vector of the virtual PD is updated on the basis of the following formula.

$$(Zx, Zy, Zz) = (Zx, Zy, Zz) + Nx \times M \times (Wx, Wy, Wz) \quad \text{formula 3}$$

Here, the constant M indicates an intensity for the change, and is preset. If the value of the constant is 0, a state is obtained in which there is no change (i.e., the z axis component is not changed). The higher the value is, the more the z axis component is changed. In addition, the length of the z axis component is normalized to 1.

Next, in step S4, a process for adjusting the x axis component of the virtual PD so as to match the changed z axis component is performed. Specifically, the outer product of the z axis component (Zx, Zy, Zz) and the y axis component (Yx, Yy, Yz) of the attitude of the virtual PD is calculated, and this result is set as a new x axis component (Xx, Xy, Xz). Furthermore, the length of the x axis component is normalized to 1.

Next, in step S5, a process for adjusting the y axis component of the virtual PD so as to match the changed z axis component is performed. Specifically, the outer product of the x axis component (Xx, Xy, Xz) and the z axis component (Zx, Zy, Zz) of the attitude of the virtual PD is calculated, and the result is set as a new y axis component (Yx, Yy, Yz). It is noted that since the lengths of the z axis component and the x axis component are normalized to 1 in steps S3 and S4 described above, normalization of the y axis component is unnecessary here.

Next, in step S6, a pointing position on the virtual screen is calculated on the basis of the attitude, in particular, the leading end direction, of the virtual PD on which the adjustment has been performed as described above. Then, a process of reflecting this pointing position as a pointing position on the screen of the television 2 is performed. With this, the process according to the present embodiment ends.

As described above, in the present embodiment, the leading end direction of the virtual PD is changed in the right-left direction in the coordinate system for the virtual screen on the basis of the turning direction of the terminal device 7. Then, a pointing position is calculated on the basis of the changed leading end direction of the virtual PD. Thus, it is possible to change the pointing position on the screen in the right-left direction even either in the case of an operation of rotating the terminal device 7 about the y axis (the case of tilting the leading end direction) or in the case of an operation (turning operation) of rotating the terminal device 7 about the z axis.

In the case where both of the operations are performed together, it results in addition of each change in the right-left direction. For example, it is assumed that an operation of rotating the terminal device 7 about the y axis thereof is performed, and a pointing position can be moved rightward by a distance of "1" with this operation. In addition, it is assumed that simultaneously with this operation or after this operation, an operation of rotating the terminal device 7 about the z axis thereof is performed, and the pointing position can be moved rightward by a distance of "2" with this operation. Such a case results in rightward movement of the pointing position by a distance of "3".

In addition, for example, the following case is assumed. The terminal device 7 is rotated leftward about the z axis in a state where an operation of rotating the terminal device 7 about the y axis thereof is performed and the pointing position is moved rightward by a distance of "1". The pointing position can be moved leftward by a distance of "1" with the turning operation in the leftward direction. In such a case, as a change of the pointing position, the pointing position is moved rightward with an operation of rotating the terminal device 7 rightward about the y axis, and then returns to the original position with a turning operation. By combining an operation of rotating the terminal device 7 about the y axis and an operation of rotating the terminal device 7 about the z axis as described above, it is also possible to more finely change the pointing position.

In the embodiment described above, the attitude of the virtual PD is changed on the basis of the turning direction (variable Nx), and then a pointing position is calculated. In another embodiment, a pointing position on the virtual screen may be calculated in first, the coordinate of the pointing position may be changed on the basis of the variable Nx described above, and the pointing position may be reflected as a pointing position on the television 2.

In the embodiment described above, an attitude vector of the virtual PD arranged in the virtual space is calculated on the basis of an output from the motion sensor 82. Then, the leading end direction of the virtual PD is changed on the basis of the coordinate system for the virtual screen. However, the exemplary embodiments are not limited thereto. In another embodiment, on the assumption that a coordinate system for the real space is defined such that the lateral direction of pointing is defined as an x axis and the vertical direction of pointing is defined as a y axis, an attitude vector of the terminal device 7 in the real space may be calculated, and a variable Nx may be calculated on the basis of the attitude vector. Then, the z axis component of the attitude vector of the terminal device 7 may be changed on the basis of the coordinate system for the real space.

Figure 13:
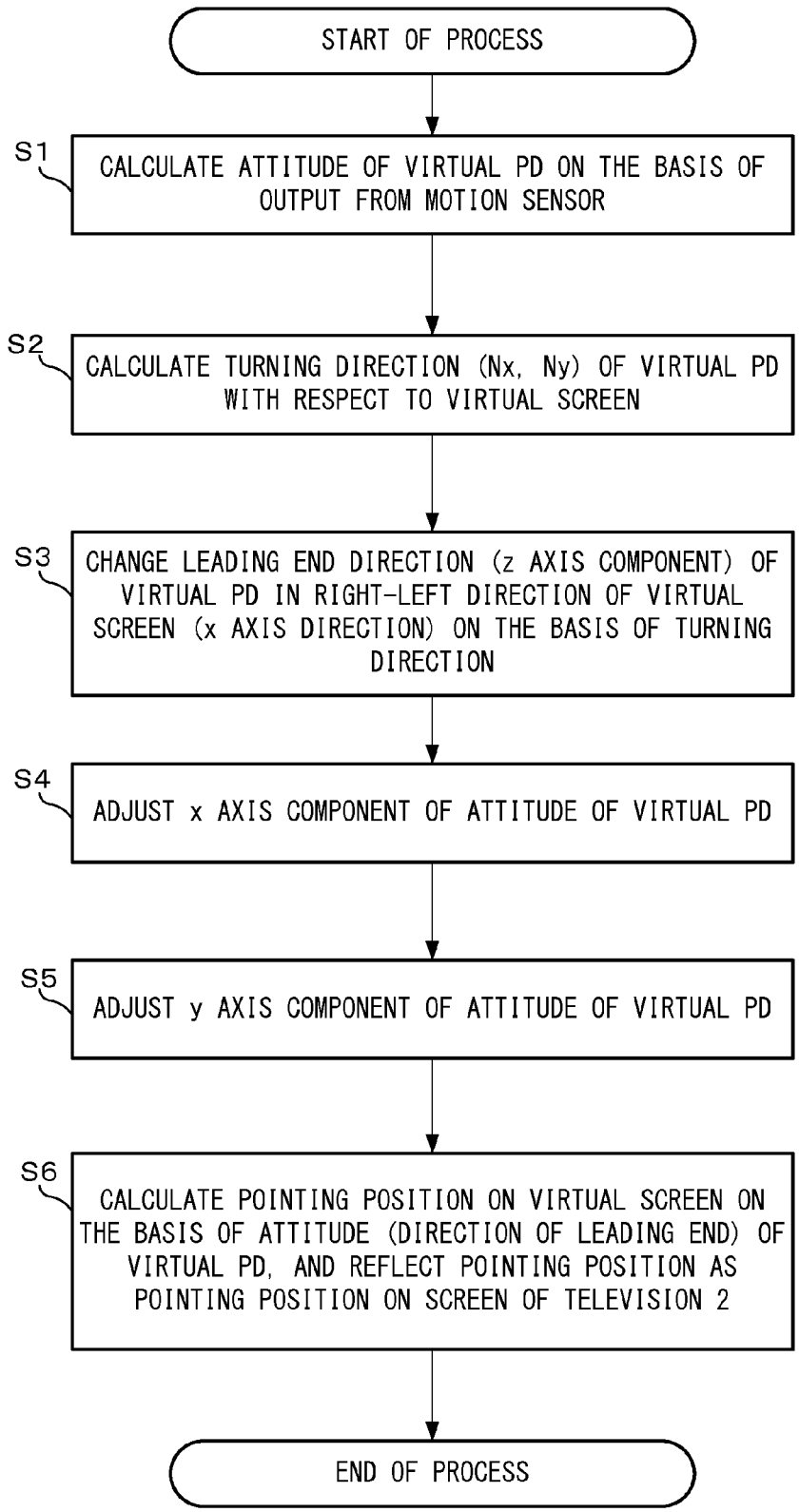
FIG. 13 is a flowchart showing an assist process in detail.

It is noted that in particular, steps S3 to S5 in the process of the flowchart of FIG. 13 described above are performed every frame regardless of presence/absence of a turning operation. That is, the processes in steps S3 to S5 described above are performed even if a turning direction (variable Nx) is 0. Regarding this point, in another embodiment, for example, it may be determined whether Nx is 0 as a result of the process in step S2 described above, and the processes in steps S3 to S5 may not be performed if Nx is 0. However, in information processing in which the same process is repeated on a frame-by-frame basis, for example, as in game processing, it is preferable that the same process is deliberately repeated as in the flowchart of FIG. 13 described above. This is because a processing load is varied in the case where presence/absence of execution of the subsequent process is changed on the basis of whether the variable Nx is 0, and in a case like the game processing described above, it is often preferable that rather than such a processing load occurs, a processing load is constant and uniform. Therefore, in a case of a pointing operation in information processing other than game processing, a process method in which the processes in steps S3 to S5 as described above are skipped may be used.

In the embodiment described above, the example of application to a pointing operation has been taken. In another embodiment, in addition to the pointing operation, the process described above is also applicable to operations such as an operation of a steering wheel of a vehicle and an operation of a control stick of an airplane. That is, by applying the process described above to an operation of changing an input device, which is held by both hands, to change an input in a right-left direction, it is possible to further enhance the operability. In addition, for example, a dogfight game in which a fighter plane is displayed on a game screen in a rear viewpoint is assumed. Furthermore, as a controller, an input device having a fighter plane shape is assumed. And, in a game in which the attitude of a fighter plane can be changed by changing the attitude of the fighter-plane-shaped input device itself, it is possible to further enhance the operability of the fighter plane by applying the process described above.

In the embodiment described above, a process for changing a pointing position when a turning operation is performed on the terminal device 7 is performed in a single apparatus. In another embodiment, the series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

What is claimed is:

1. A computer-readable non-transitory storage medium having stored thereon an information processing program executed by a computer of an information processing apparatus which performs a predetermined process on the basis of an output from an operation device including an angular velocity sensor, the information processing program causing the computer to perform at least:

attitude calculation to calculate an attitude of the operation device and a virtual operation device which is arranged in a virtual space and corresponds to the operation device, on the basis of an output from the angular velocity sensor;

rotation amount change to change an amount of movement of the virtual operation device at least in a direction of a first axis in a coordinate system for a space in which the operation device or the virtual operation device is present, on the basis of a rotation amount of the operation device around a second axis which is perpendicular to the first axis, the amount of movement of the virtual operation device at least in the direction of the first axis being calculated on the basis of the attitude of the operation device; and process execution to perform the predetermined process on the basis of the rotation amount in the direction of the first axis which has been changed by the rotation amount change, wherein, a pointing direction of the virtual operation device changes without a pointing direction of the operation device changing, wherein the predetermined process is a pointing process of pointing to a position on a predetermined screen.

2. The computer-readable non-transitory storage medium according to claim 1, wherein the process execution performs the predetermined process on the basis of a rotation amount around the first axis and the amount of movement in a direction parallel to the first axis which has been changed by the rotation amount change.

3. The computer-readable non-transitory storage medium according to claim 1, wherein the rotation amount change changes the amount of movement in the direction of the first axis such that the amount of movement in the direction of the first axis is proportional to the rotation amount around the second axis.

4. The computer-readable non-transitory storage medium according to claim 1, wherein the rotation amount change includes a change content determination to determine whether to increase or decrease the amount of movement in the direction of the first axis, in accordance with a direction of rotation around the second axis.

5. The computer-readable non-transitory storage medium according to claim 1, wherein the operation device includes a housing which is held by right and left hands of a user so that an operation is allowed to be performed.

6. The computer-readable non-transitory storage medium according to claim 5, wherein the first axis is an axis along a direction of rotation of the operation device when the operation device is rotated such that: when a right hand side of the housing held by the right and left hands of the user is moved in a direction away from the user as seen from the user, a left hand side of the housing is moved in a direction toward the user as seen from the user; and when the right hand side of the housing is moved in the direction toward the user as seen from the user, the left hand side of the housing is moved in the direction away from the user as seen from the user, and the second axis is an axis which is a rotation axis when the attitude of the operation device is rotated such that: when the right hand side of the housing held by the right and left hands of the user is lifted as seen from the user, the left hand side of the housing is lowered; and when the right hand side of the housing is lowered as seen from the user, the left hand side of the housing is lifted.

7. The computer-readable non-transitory storage medium according to claim 1, wherein the first axis is an axis which is perpendicular to a direction of gravity and is along a right-left direction as seen from the user, and the second axis is an axis which is perpendicular to both the first axis and the direction of gravity.

8. The computer-readable non-transitory storage medium according to claim 1, wherein
when the rotation amount change changes the amount of movement by using the virtual operation device, the predetermined process is a pointing process with respect to a virtual screen arranged in the virtual space in which the virtual operation device is arranged.

9. An information processing apparatus which performs a predetermined process on the basis of an output from an operation device including an angular velocity sensor, the information processing apparatus comprising a computer configured to perform at least:
attitude calculation to calculate an attitude of the operation device and a virtual operation device which is arranged in a virtual space and corresponds to the operation device, on the basis of an output from the angular velocity sensor;
rotation amount change to change an amount of movement of the virtual operation device at least in a direction of a first axis in a coordinate system for a space in which the operation device or the virtual operation device is present, on the basis of a rotation amount of the operation device around a second axis which is perpendicular to the first axis, the amount of movement of the virtual operation device at least in the direction of the first axis being calculated on the basis of the attitude of the operation device; and
process execution to perform the predetermined process on the basis of the rotation amount in the direction of the first axis which has been changed by the rotation amount change, wherein,
a pointing direction of the virtual operation device changes without a pointing direction of the operation device changing, wherein
the predetermined process is a pointing process of pointing to a position on a predetermined screen.

10. An information processing system including a display device which performs a predetermined process on the basis of an output from an operation device including an angular velocity sensor, the information processing system comprising a computer configured to perform at least:
attitude calculation to calculate an attitude of the operation device and a virtual operation device which is arranged in a virtual space and corresponds to the operation device, on the basis of an output from the angular velocity sensor;
rotation amount change to change an amount of movement of the virtual operation device at least in a direction of a first axis in a coordinate system for a space in which the operation device or the virtual operation device is present, on the basis of a rotation amount of the operation device around a second axis which is perpendicular to the first axis, the amount of movement of the virtual operation device at least in the direction of the first axis being calculated on the basis of the attitude of the operation device; and
process execution to perform the predetermined process on the basis of the rotation amount in the direction of the first axis which has been changed by the rotation amount change, wherein,
a pointing direction of the virtual operation device changes without a pointing direction of the operation device changing, wherein
the predetermined process is a pointing process of pointing to a position on a predetermined screen.

11. An information processing method for controlling an information processing apparatus or system which performs a predetermined process on the basis of an output from an operation device including an angular velocity sensor, the information processing method comprising:
calculating an attitude of the operation device and a virtual operation device which is arranged in a virtual space and corresponds to the operation device, on the basis of an output from the angular velocity sensor;
changing an amount of movement of the virtual operation device at least in a direction of a first axis in a coordinate system for a space in which the operation device or the virtual operation device is present, on the basis of a rotation amount of the operation device around a second axis which is perpendicular to the first axis, the amount of movement of the virtual operation device at least in the direction of the first axis being calculated on the basis of the attitude of the operation device; and
performing the predetermined process on the basis of the rotation amount in the direction of the first axis which has been changed by the changing the rotation amount, wherein,
a pointing direction of the virtual operation device changes without a pointing direction of the operation device changing, wherein
the predetermined process is a pointing process of pointing to a position on a predetermined screen.

* * * * *